United States Patent
Johansson et al.

(10) Patent No.: US 6,442,391 B1
(45) Date of Patent: Aug. 27, 2002

(54) LOCATION SECURITY FOR A SUBSCRIBER UNIT IN A TELECOMMUNICATION SYSTEM BY DENYING A PARTIES' LOCATION REQUEST

(75) Inventors: Jörgen Johansson; Magnus Lundin, both of Karlskrona (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/075,185

(22) Filed: May 11, 1998

(30) Foreign Application Priority Data

May 16, 1997 (SE) ................................................ 9701845

(51) Int. Cl.$^7$ .............................................. H04B 7/005
(52) U.S. Cl. ....................................... 455/456; 455/433
(58) Field of Search ................................. 455/410, 411, 455/26.1, 456, 457, 433; 701/213, 201, 207, 208

(56) References Cited

U.S. PATENT DOCUMENTS

| | | | |
|---|---|---|---|
| 5,614,914 A | * 3/1997 | Bolgiano | 342/364 |
| 5,625,668 A | * 4/1997 | Loomis | 379/58 |
| 5,857,153 A | * 1/1999 | Lupien | 455/422 |
| 5,905,958 A | * 5/1999 | Houde | 455/437 |
| 5,963,866 A | * 10/1999 | Palamara | 455/456 |
| 5,983,103 A | * 11/1999 | Sakaguchi | 455/435 |
| 6,131,067 A | * 10/2000 | Girerd | 701/213 |
| 6,199,045 B1 | * 3/2001 | Giniger | 705/1 |

* cited by examiner

Primary Examiner—Daniel Hunter
Assistant Examiner—Nick Corsaro
(74) Attorney, Agent, or Firm—Burns, Doane, Swecker & Mathis, L.L.P.

(57) ABSTRACT

The present invention relates to determining the geographic location of a mobile station in a mobile communications system. The object of the invention is to protect the integrity of the user of the mobile station, so as to prevent the location of the mobile station being established by an outsider against the will of the user. In this respect, an authorization check is carried out in conjunction with a request for determination of the geographical location of a mobile station. The geographical location is only determined when authorization is found for the mobile station to be located. This authorization control involves checking that the user of the mobile station has granted permission for the location of his mobile station MS to be determined on the part of an outsider. The authority check may also include the condition that only certain outsiders may be informed of the geographical location of the mobile station.

7 Claims, 8 Drawing Sheets

LOCATION SECURITY FOR A SUBSCRIBER UNIT IN A TELECOMMUNICATION SYSTEM BY DENYING A PARTIES' LOCATION REQUEST

This application claims priority under 35 U.S.C. §§119 and/or 365 to SE 9701845-1 filed in Sweden on May 16, 1997; the entire content of which is hereby incorporated by reference.

FIELD OF INVENTION

The present invention relates to a telecommunications system especially one that includes a mobile communications system and a mobile locating means with which the geographical location of a terminal in the mobile communications system can be determined.

BACKGROUND OF THE INVENTION

The manner in which the geographical location of a mobile station in a mobile communications system can be determined is described in a large number of patent specifications.

Some patent specifications, for instance SE 9500569-0, Europolitan, describes a procedure with which the location of a mobile station is determined by the American GPS system. This requires the mobile station to be also equipped with a GPS terminal. A GPS terminal can determine its geographical location, by receiving signals from at least three satellites. An inquiry from a third party concerning the location of the mobile station can be sent over the mobile communications system and handled by the mobile station without involving its user. The location of the mobile station is then sent back over the network to the person requesting the information.

In the majority of these solutions, the measurements necessary for establishing the location of the mobile station are carried out by the mobile communications system instead. For instance, Patent Specification SE 9603561-3, Bodin1, describes how the wave propagation time of a signal from the mobile station is measured in a base station. The wave propagation time is corresponded by a distance. The measuring process is repeated at two more base stations. The location of the mobile station can then be established on the basis of the measuring results and on the knowledge of the geographical locations of the base stations. According to this prior patent specification, the calculation is made in a mobile locating node belonging to the mobile communications system.

Alternatively, the wave propagation time of a signal sent from a base station may be measured in the mobile station. This method is described in Patent Specification U.S. Pat. No. 5,293,645, Sood, among others. After having measured the wave propagation from at least three base stations, the mobile station reports the result to the land based part of the mobile communications network.

It is also mentioned in SE 9500569-0 that the geographical location of a mobile station can be determined through the identity of the cell within which the mobile station is located. It is the mobile communications system that is able to obtain the cell identity information. This method can only provide a rough indication of the location of the mobile station, since the indicated cell may well have a radius in the order of tens of kilometres.

Patent Specification SE 9700522-7, Bodin2, describes how a mobile locating command can be sent from a mobile locating node outside the mobile communications system to the mobile switching center that manages the mobile station. The switching center is assumed to control the base station system to carry out measurements that will determine the location of the mobile station with the aid of some earlier known measuring method. The mobile locating node provides a mobile locating service, in which it receives orders from a customer concerning the location of a certain mobile station, orders the switching center to carry out a measuring procedure, receives the measuring result, and calculates the location of the mobile and then presents the result to the customer. A modified short message service (SMS) is used to send the command to the switching center and to send the measuring result from the switching center to the mobile locating node.

None of the aforementioned patent specifications draws attention to the encroachment of the integrity of a user of a mobile station when an outsider is able to establish the geographical location of the user.

SUMMARY OF THE INVENTION

The present invention addresses the problem of an outsider being able to establish the geographical location of a mobile station with the aid of a mobile locating service. Determination of the geographical location of a mobile constitutes a problem when it takes place against the wishes of the mobile user.

Another problem addressed by the invention is when the user of the mobile station may wish an outsider to be informed of his location on certain occasions while keeping the possibility of preventing an outsider from being informed of his location on other occasions.

Another problem is one when the user may wish for a person of his choice to be informed of his location while denying this possibility to other persons.

Accordingly, an object of the present invention is to protect the integrity of a mobile user, such as to prevent outsiders from determining the location of the mobile with the aid of a mobile locating service. Another object is to provide a flexible integrity protection service which enables the geographical location of the mobile to be determined when the user so desires or when it is in the user's interest for the location of the mobile to be determined.

The aforesaid problems are solved in accordance with the present invention, by providing the mobile communications system with an indicator. The indicator is set either to indicate that the user permits the location of the mobile to be determined, i.e. a permission granted state, or to a state in which the user does not permit the location of the mobile to be determined, i.e. permission not granted state. Before determining the location of a mobile, a check is made to ascertain whether or not the indicator is in its permission granted state. If not, the location determining process is discontinued. The user of the mobile is able to set the indicator to the state desired. In one embodiment the subscriber, i.e. the owner of the subscription which may be different than the current user, has the possibility to prevent someone who is using the subscriber's mobile station MS from changing the indicator.

According to one alternative embodiment, the user of the mobile receives a request for permission to determine the location of his mobile. This embodiment can be suitably used when the user himself has requested from a service provider a service that is dependent on the geographical location of the user. The service provider contacts a mobile locating node and asks to be told of the location of the mobile station. The mobile locating node asks the user for permission to determine the location of the mobile. The user gives his permission directly to the mobile locating node. Alternatively, the user gives his permission to the mobile locating node via the service provider. This is effected by sending to the service provider a code that the user has received together with the permission request, wherewith the service provider sends the code to the mobile locating node. The location of the mobile is determined when the code received agrees with the code sent together with the request.

In addition to checking the permission indicator, a check can also be made to ascertain whether or not the person requesting determination of the location of the mobile is registered and that authorization for this person to establish the location of the sought mobile is also registered, said checks being carried out before determining the location of the mobile. In this case, registration of this information is a condition for allowing the location of the mobile to be determined. This information is stored in a register connected to or integrated with the mobile locating node.

The invention provides the advantage of enabling the user of a mobile station to prevent the geographical location of the mobile being established and divulged. The invention can be applied in a number of different forms that are suited for different situations. For instance, this enables a haulage contractor to establish the locations of its own mobile stations regularly and in a simple manner, while, at the same time, preventing others from establishing the locations of said mobiles. It also enables a private user to prevent the location of his mobile station being determined while, at the same time, enabling the user to establish his own location on certain occasions when needed by the user. The various embodiments of the invention thus enable the integrity of the user to be protected in a flexible manner.

The invention also has the advantage of being adapted for the administrative structure in the mobile communications system. It is essential to adapt to the existing structure, so as not to increase the complexity of the mobile communications system. The introduction of the indicator in the mobile communications system enables the user to set the indicator to the state desired directly and involves a only minor modification of the mobile communications system.

The invention will now be described in more detail with reference to preferred exemplifying embodiments thereof and also with reference to the accompanying drawings.

DESCRIPTION OF PREFERRED EMBODIMENTS

The present invention enables the user of a mobile station to prevent an outsider from learning of the user's geographical location with the aid of a mobile locating service.

Figure 1:
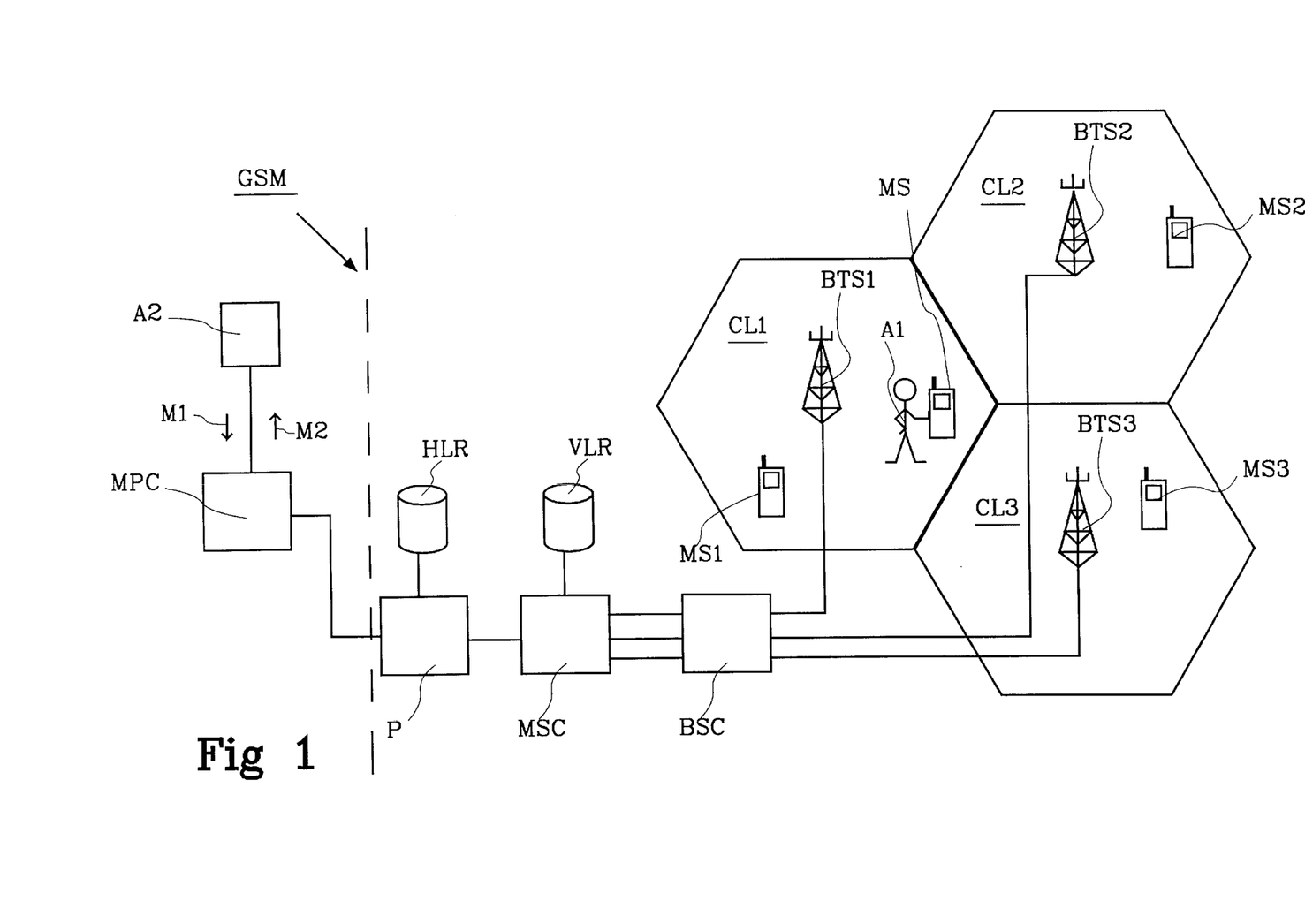
FIG. 1 illustrates a mobile communications system in which a mobile locating node is connected.

FIG. 1 illustrates one such mobile communications system GSM. It is managed by an Operator. The mobile communications system GSM includes a number of mobile stations MS, MS1–MS3. A user A1 of the mobile station MS moves freely and is able to communicate via the mobile communications system GSM provided that the user is located within the service area of the GSM system. The service area is divided into a number of cells CL1–CL3. Located in each cell CL1–CL3 is a respective radio base station BTS1–BTS3 that can maintain connection with the mobile stations MS, MS1–MS3 within the cell. A number of radio base stations BTS1–BTS3 communicate with a base station controller BSC, The base station controller BSC communicates, in turn, with a mobile services switching center MSC. The mobile communications system GSM includes at least one GMSC (Gateway Mobile Switching Center) P which communicates with the remaining mobile switching centers MSC of the mobile communications system. The GMSC P also communicates with a home location register HLR. Each mobile station MS, MS1–MS3, with an subscription to the mobile communications system GSM is registered in the home location register HLR. Also visiting mobile stations with subscriptions in other mobile communications systems are temporarily registered in the home location register HLR. The home location register HLR contains data as to the whereabouts of the mobile stations MS, MS1–MS3 as well as visiting mobile stations. In addition to the home location register HLR, the mobile communications system GSM includes a further subscriber location register, i.e. a visitor location register VLR, containing data relating to the mobile station MS. The visitor location register VLR is connected to the mobile services switching center MSC.

The mobile communications system GSM is designated as the land based part of the mobile communications network, with the exception of the mobile station MS and the radio connection thereto.

The system shown in FIG. 1 includes a mobile locating node MPC connected to the GMSC P. The mobile locating node MPC provides a mobile locating service, which means that the node MPC will establish the location of a mobile station MS, MS1–MS3 in response to a request from a second party A2 in this respect and inform this second party of the geographical position of the mobile station. To this end, there is found a connection between the second party A2 and the mobile locating node MPC, via which the mobile locating nod e receives the location-finding request M1 and informs the second party of the location of the mobile station in a response M2.

Figure 2:
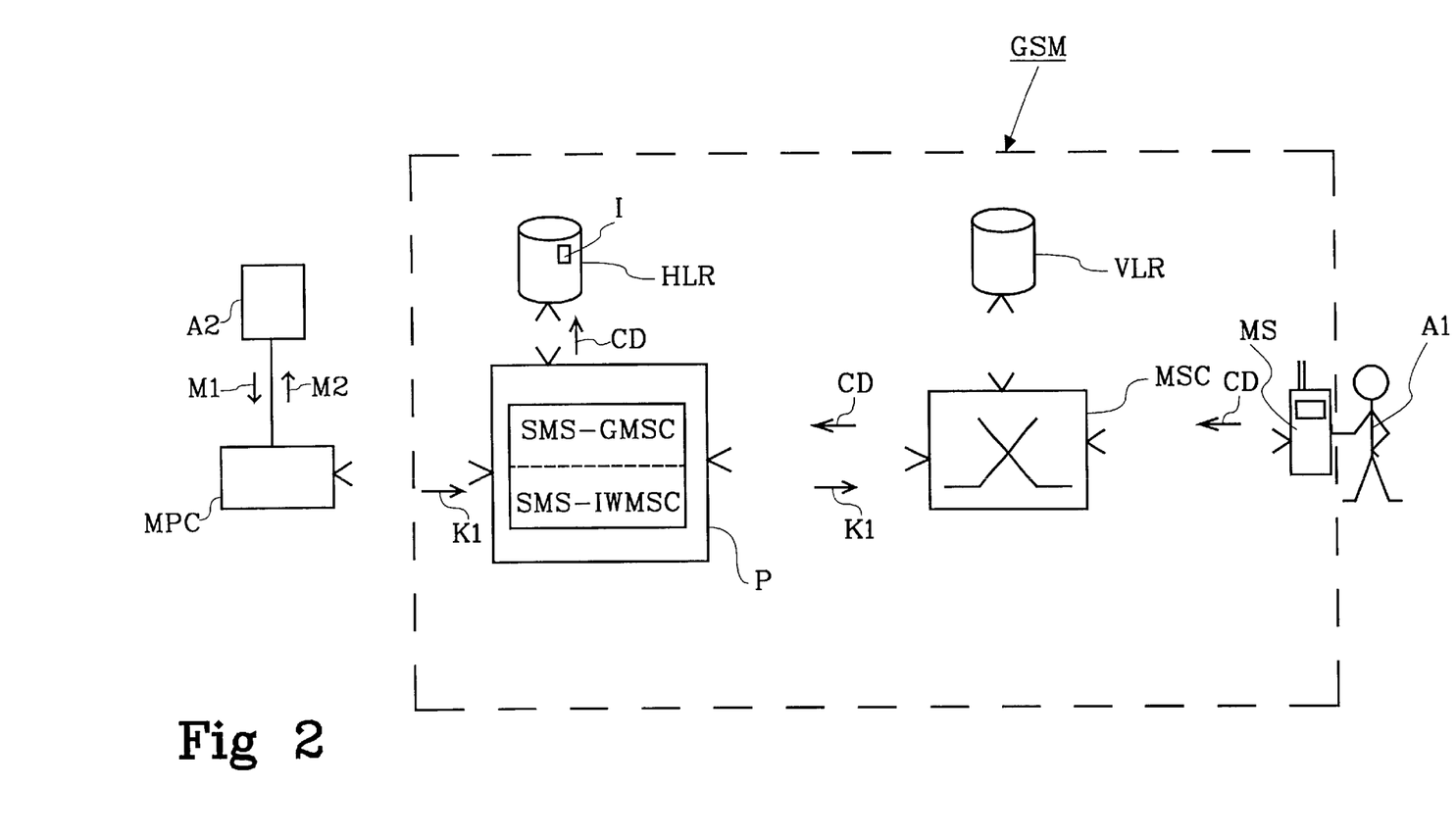
FIG. 2 is a block schematic illustrating a mobile communications system in which a short message is transmitted.

FIG. 2 is a block schematic illustrating an inventive arrangement. In addition to those nodes also shown in FIG.

1, the arrangement includes an indicator I provided in the home location register HLR. The user A1 is able to set the indicator I to indicate either one of two states, i.e. a permission granted state or a permission not-granted state. The user A1 sets the indicator to the desired state, by stating a code CD via the mobile station. The code CD is sent from the mobile station as though it were a B-number, i.e. the number of a B-subscriber dialled for a call connection. When the code CD has been transferred to the GMSC P, the GMSC P identifies the code CD as a message to the home location register HLR and not as a standard B-number. The GMSC therefore sends the code CD to the home location register HLR. The home location register HLR then sets the indicator to indicate the desired integrity level.

The code CD may be either one of two character combinations denoting either that determining of the location of the mobile is allowed or not allowed. These two character combinations may be *99# and *98#. The transfer of this code to and its registration in HLR are effected analogously with how the call forwarding service is utilized from the mobile station MS.

FIG. 2 illustrates with the aid of an arrow the transfer of a mobile locating command K1 from the location node MPC to the mobile services switching center MSC via the GMSC P. The command K1 is described more explicitly further on in the text.

Figure 3:
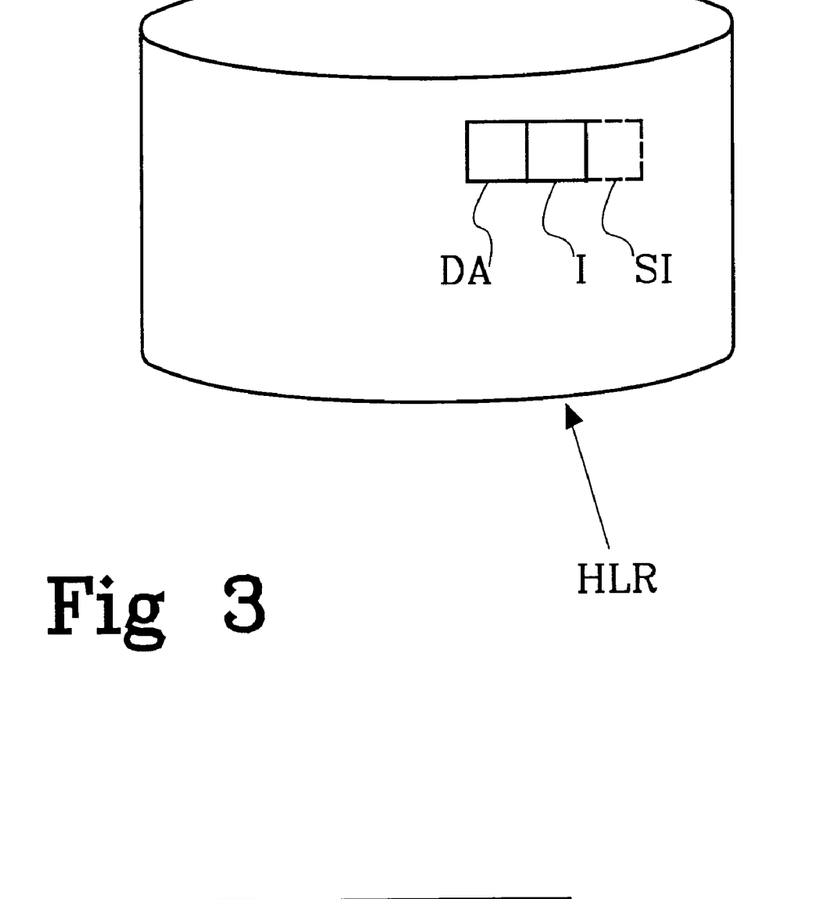
FIG. 3 illustrates a modified home location register.

FIG. 3 shows a home location register HLR that has been modified by the inclusion of the indicator I. Data concerning the mobile station MS are stored in a number of different information fields in the home location register HLR. The information fields are found with the aid of the mobile station identity DA, among other things. A further information field for storing the indicator I is included on the home location register, as shown in FIG. 3.

Figure 4:
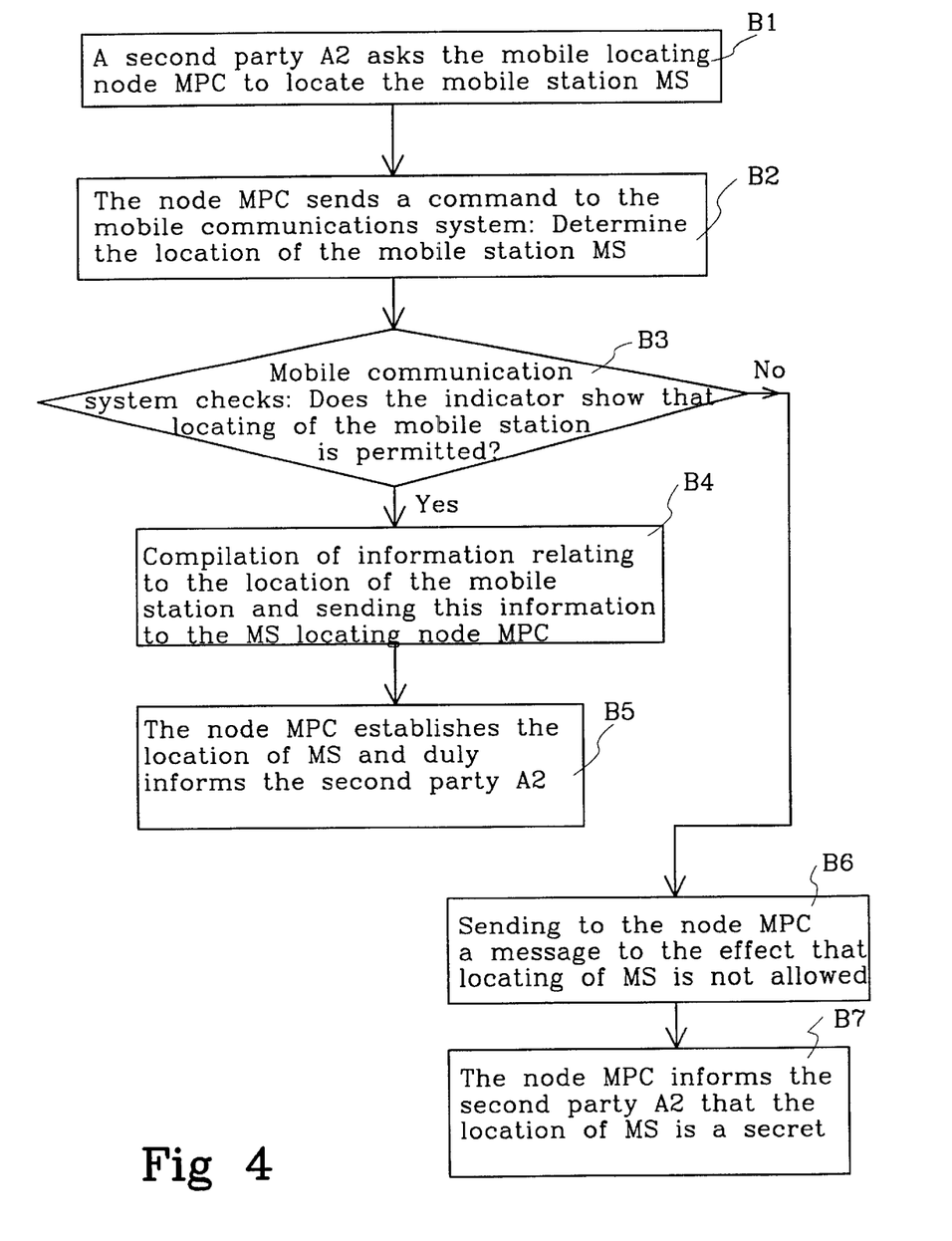
FIG. 4 is a flowchart illustrating a state checking procedure in conjunction with a mobile locating process.

FIG. 4 is a flowchart illustrating one embodiment of the inventive method, where a second party A2 desires information concerning the location of the mobile station MS. In a first step B1, the second party A2 sends a request M1 to the mobile locating node MPC asking to be informed of the whereabouts of the mobile station MS.

The mobile locating node MPC then sends a command K1 to the mobile switching center MSC that serves the mobile station MS at that moment in time. The purport of the command K1 is for the switching center MSC to collect locational data relating to the mobile station MS and send it to the mobile locating node MPC, in accordance B2 in FIG. 4. The command K1 is sent in the form of a modified SMS message addressed to the mobile station MS, as described in SE 9700522-7.

The command K1 reaches the mobile communications system via the GMSC P, which identifies the command K1 as being a location-finding command. The GMSC P asks the home location register HLR for routing information, so as to be able to forward the command K1. The GMSC P indicates in the request that the routing information is intended for a mobile locating command K1. Upon receipt of the request, the home location register HLR reads the register HLR indicator I and provides the requested routing information, provided that the indicator indicates that it is allowed to divulge the geographical location of the mobile. This is corresponded by a step B3 in FIG. 4, i.e. the step in which the mobile locating state of the indicator is checked. If mobile locating is allowed, i.e. Yes to the question in step B3 of FIG. 4, the command K1 is forwarded to the GMSC P to the mobile switching center MSC.

The switching center begins to collect locational data relating to the mobile station MS, upon receipt of the command K1. The collected locational data is then sent to the mobile locating node MPC, in accordance with step B4.

The mobile locating node MPC then establishes the location of the mobile station MS with the aid of the locational data received, and presents the result to the second party A2 in a message M2, in accordance with step B5.

Should the answer to the question in step B3 be No, locating of the mobile is not allowed, as is the case when the indicator I in the home location register HLR indicates that location-finding is not allowed, no mobile locating procedure is carried out. Instead a message is sent to the mobile locating node MPC to the effect that permission to divulge the location of the mobile station MS is not given, in accordance with step B6. Instead of sending routing information, the home location register HLR sends a message to the GMSC P to the effect that the information requested cannot be given, because divulgence of the location of the mobile station MS is not permitted. GMSC P sends to the mobile location node MPC a message to the effect that the location of the mobile station MS has not been determined because permission is lacking.

The mobile locating node MPC then sends a message to the second party A2 to the effect that the location of the mobile station MS cannot be divulged, because permission is lacking in this respect, in accordance with step B7.

Figure 5:
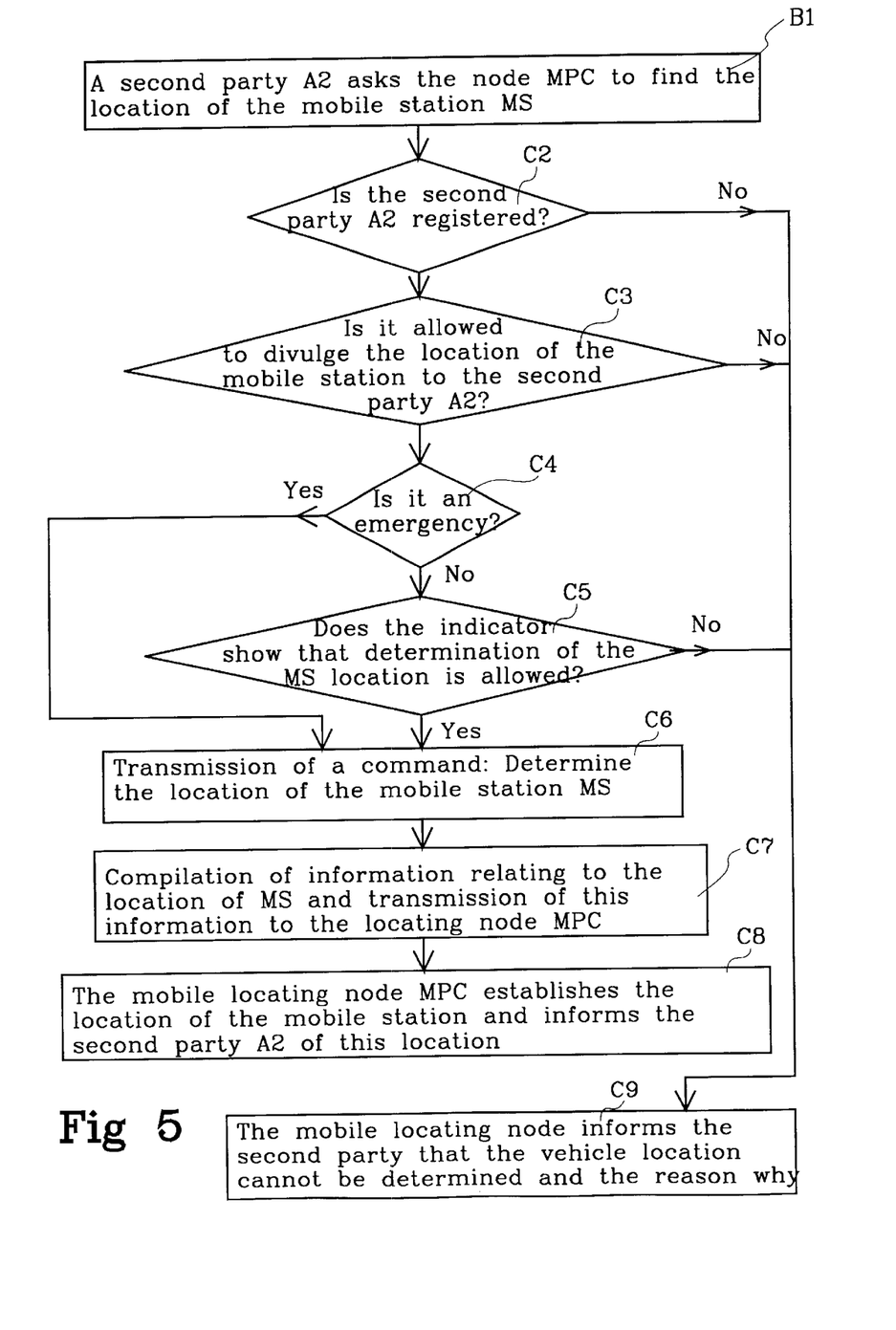
FIG. 5 is a flowchart that illustrates an alternative procedure in which authorization checks are carried out in conjunction with a mobile locating process in addition to an indicator check.

FIG. 5 illustrates an alternative embodiment of the method for checking whether or not establishment of the location of the mobile station MS is permitted. The procedure followed in accordance with this method is similar to the procedure followed according to FIG. 4, but with the difference that authorization checks are carried out on the second party A2.

The procedure followed in accordance with FIG. 5 is commenced with a step B1, similar to the procedure described in FIG. 4, in which the second party A2 sends a message M1 requesting the geographical location of the mobile station MS.

A check is then run to ascertain whether or not the second party A2 is known to the mobile locating node MPC, in accordance with a following step C2. One reason for this check is to be able to bill the second party for the mobile locating service. If the second party A2 is known, i.e. the answer to the query in step C2 is Yes, step C3 is carried out.

In step C3, a check is run to ascertain whether or not the second party A2 is entitled to be informed of the location of the mobile station MS. In order to be entitled to check the mobile station MS, this entitlement must have earlier been registered in the mobile locating node MPC. If the check shows that the second party is entitled to be informed of the geographical position of the mobile, i.e. the answer to the question in step 3 is yes, step C4 is carried out.

In step C4, a check is run to ascertain whether the mobile locating request has been made in an emergency situation. An emergency situation can be reported, for instance, by the second party saying as such in conjunction with the mobile locating request, and by the second party indicating that it has an alarm center status. In the event of an emergency, i.e. the answer to the question in step C4 is Yes, step C6 is carried out.

On the other hand, if the answer to the question in step C4 is No, i.e. there is no emergency, a check is run to ascertain whether the indicator 1 shows that the user A1 permits the location of his mobile station MS to be determined in accordance with step C5. This check is carried out by the mobile locating node MPC sending a query as to whether or not it is allowed to locate the mobile station MS. This permission query is received by the GMSC P and forwarded to the home location register HLR. The home location register HLR deals with the query and the GMSC P sends the answer to the mobile locating node MPC. If the answer is Yes, locating the mobile station MS is allowed, step C6 is carried out. According to step C6, a command K1 to locate the position of the mobile station MS is sent from the mobile locating node MPC to the mobile switching center MSC. The indicator I is not checked when the command K1 is transmitted in the case of this embodiment.

The switching center MSC collects mobile station MS locational data. The obtained mobile station MS locational data is then sent to the mobile locating node MPC, in accordance with step C7.

The mobile station MS location data may optionally be further processed in the mobile locating node MPC, whereafter the location of the mobile station MS is established and presented to the second party A2 in a message M2, in accordance with step C8 in FIG. 5.

If, as distinct to what has been assumed in the aforegoing, the second party A2 is not registered in the mobile locating node MPC or it is found that the second party is not entitled to information revealing the location of the mobile station MS concerned, or if the indicator I shows that divulgence of the location of the mobile station MS is not allowed, in other words the answer to any of the questions asked in step C2, C3 or C5 is No, the location of the mobile station MS is not determined and the mobile locating node informs the second party to this effect and gives the reasons why, in accordance with C9.

The procedure described in FIG. 5 includes two further authorization checks, in addition to checking whether or not the second party A2 is known (step C2). The first of these authority checks is made in accordance with step C3, in order to ascertain whether or not the second party A2 is entitled to be told of the location of precisely the mobile station to which the request is directed. For instance, a firm of haulage contractor has the right to know the locations of its own mobile stations, but does not have the right to know the geographical location of a mobile station belonging to a competitor. When the second party is an alarm center, i.e. has the telephone number 112 in the case of Sweden, it can be given the right to be told of the locations of all mobile stations.

It is also possible to divide the right to know the locations of mobile stations in accordance with different authority gradings. For instance, a low priority in this respect may mean that the second party A2 may only be told within which part of the country the mobile station MS is located.

The second of these authority checks is carried out in accordance with step C5, with the purpose of ascertaining whether or not the user has given the permission for the location of the mobile station to be determined. For instance, an employee A1 of the aforesaid haulage contractor may allow the location of the mobile station MS to be determined at the beginning of a work shift. This employee may wish to deny the employer the possibility of establishing the employer's location at the end of the shift and, therefore, withdraws the permission, by setting the indicator I to a state which indicates that permission is not granted.

In an optional addition to any of the embodiments with reference to FIG. 4 and FIG. 5 the user A1 can change the indicator I only if the subscriber has given permission to change the indicator I. In most cases the user and the subscriber are the same person, but in some cases they are different persons. One example is the firm of haulage contractors being the subscriber of a subscription associated with the mobile station MS. The mobile station MS is attached to a truck driven by an employee of the firm.

In addition to the indicator I a subscriber indicator SI is implemented. A field for storing the indicator I in the home location register HLR is shown in FIG. 3 by dashed lines. The subscriber indicator SI can be set into two states. The first state is the grant state, which indicates that the subscriber grants the location of the mobile station MS to be determined. The grant state of the subscriber indicator SI overrides the indicator I. The second state is the zero state, which indicates that the state of the indicator I is decisive.

The previous described inventive methods are modified in that before checking the state of the indicator I, according to step B3 and step C3, the subscriber indicator SI is checked. If the subscriber indicator SI is in the grant state the method is continued by step B4 or alternatively step C4 without checking the indicator I. If instead the state of the subscriber indicator SI is zero, the indicator I is checked and the further step is dependent on the state of the indicator I, in the same way as in the previous described inventive methods.

The subscriber indicator SI is controlled by the operator of the mobile communication system. The subscriber gives instructions on the desired state of integrity to the operator. The operator sets the subscriber indicator SI or alternatively the additional states of the indicator I to the desired level by a man machine interface of the node in which the indicator is located, for instance the home location register HLR.

According to a further option the state of subscriber indicator SI is changed at predefined times. The change is made by a state control module in the mobile communication system. The state control module includes a clock and data program module. It is programmed by the operator to change the state at times predefined by the subscriber.

By this further option the firm of haulage contractors can prevent the employed truck driver from changing the state of the indicator I during a work period. Thereby the firm can locate the truck in which the mobile station MS is mounted during the work period. When the working period is finished the indicator I can be changed by the driver to prevent the location from being determined if the firm has instructed the operator that the indicator I is changeable at that time.

Alternatively the subscriber indicator can be set into three states instead of two. The third state is a subscriber not grant state, with the effect that the mobiles stations MS position will not be determined whatever the state of the indicator I.

In a further optional addition to the embodiment of the invention illustrated by FIG. 5 determination of the location of the mobile station MS prohibited. In a nation there are a few people whose security is of extra interest, for instance a president of the nation. An operator solely cannot be entrusted to prevent the location of a president's mobile station MS from being determined, especially since it should be unknown to the operator which of all mobile stations belongs to the president.

For this purpose a secured integrity function is supplied by for instance a secret service of the nation. The secured integrity function includes a list of the mobile stations whose locations shall be prohibited from being determined. The list is optionally encrypted. The secured integrity function also includes means for receiving and answering an inquiry for permission to determine the location of a specified mobile station. The response on the inquiry will be negative if the specified mobile station MS is included in the list.

The secured integrity function is created under control of the secret service. If the included list is encrypted the means for reading it includes encryption keys. The secured integrity function is delivered to the operator who can not read the list or the encryption keys. The operator connects the secured integrity function to the mobile communication system. Alternatively the operator downloads a program module into one of the nodes of the mobile communcation system, for example the home location register. The secured integrity function can alternatively be connected to or downloaded into the mobile location center MPC.

In the previous described method with reference FIG. 5 is modified in that in the step C3 in FIG. 5 is also the inquiry to the optional secured integrity function added. If the response on the inquiry is No, the location of the mobile station MS is excluded from being divulged, step C9 will be performed. In step C9 the second party is informed that the location of the mobile station is not divulged. The second party is not informed that this is due to the fact that permission to locate is being prohibited by the secured integrity function. If instead the response on the inquiry is Yes, step C4 will be executed.

Another embodiment of the invention can be used ideally when the user A1 of the mobile station MS contacts a service provided A2 and requests a service therefrom. In order to carry out the service, the service provider A2 needs to know of the geographical whereabouts of the user A1. This service may involve a route description or the whereabouts of the nearest hamburger restaurant.

Figure 6:
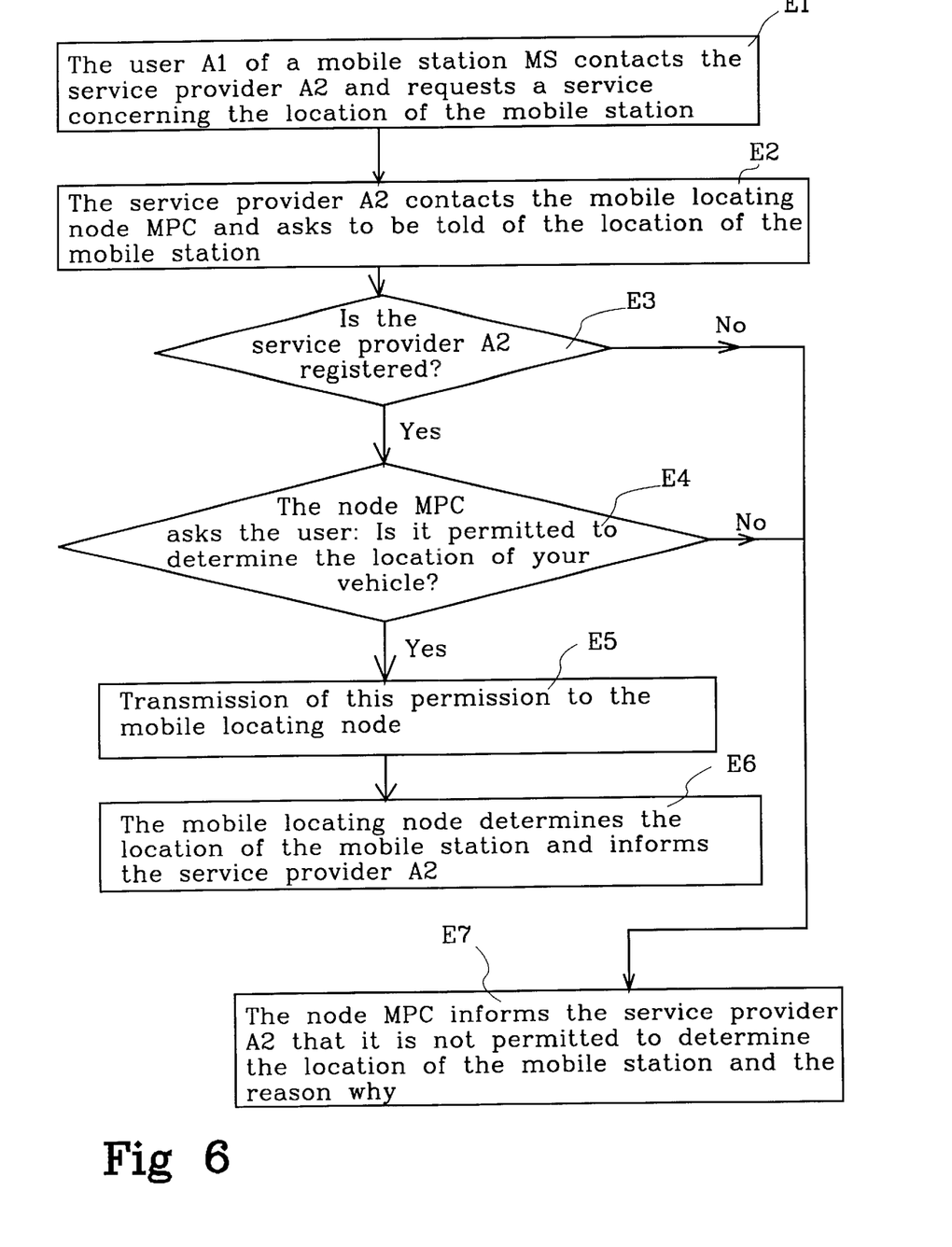
FIG. 6 is a flowchart illustrating an inventive method of checking mobile locating permission, suitable for use in conjunction with the user requesting a location-dependent service from a service provider.

FIG. 6 is a flowchart that illustrates this procedure. The user A1 initially contacts the service provider A2 and requests a service for which the geographical location of the user A1 is a necessary integral. This commencement of the procedure is shown by step E1 in FIG. 6.

The service producer A2 then sends to the mobile locating node MPC a request M1 asking for the location of the mobile station, in accordance with a following step E2.

The mobile locating node MPC then checks whether or not the service provider A2 has earlier been registered. Although this step is designated E3 in FIG. 6, it follows the same procedure as that followed in step C2 in FIG. 5. If it is found that the service provider A2 is registered, i.e. the answer to the question in E3 is Yes, a step E4 is carried out.

In step E4, the mobile locating node MPC contacts the user A1 of the mobile station MS and asks the user A1 for permission to determine the location of the mobile station MS. The identity of the service provider A2 can be given to the user A1 together with the request. The user A1 gives permission for the location of the mobile station MS to be determined, i.e. Yes to the question in step E4, by sending permission to the mobile locating node MPC via the mobile station MS, in accordance with step E5.

The mobile locating procedure is commenced when the mobile locating node MPC has received approval, wherewith the location of the mobile station MS is determined in accordance with step E6. This is achieved by sending a command K1 to the mobile switching center that collects mobile station MS location data, and sends this data back to the mobile locating node MPC. The mobile locating node MPC then sends to the service provider A2 a message M2 in which the location of the mobile station MS is revealed. If the mobile locating node MPC does not receive permission from the user A1, i.e. the question put in step E4 results in a No, or if the service producer A2 is not registered in the mobile locating node MPC, i.e. a No to the question asked in step E3, the mobile locating procedure is broken-off and the mobile locating node MPC sends a message M2 to the service provider A2 in accordance with step E7. The message M2 informs that the location of the mobile station MS cannot be determined and the reason why.

In addition to checking whether or not the service provider A2 is registered, a check is also run in step E3 on the identity of the service provider A2. This check may, for instance, require the service provider A2 to give a code word that is specific to this provider, and to obtain authorization to be informed of the location of the mobile station.

Figure 7:
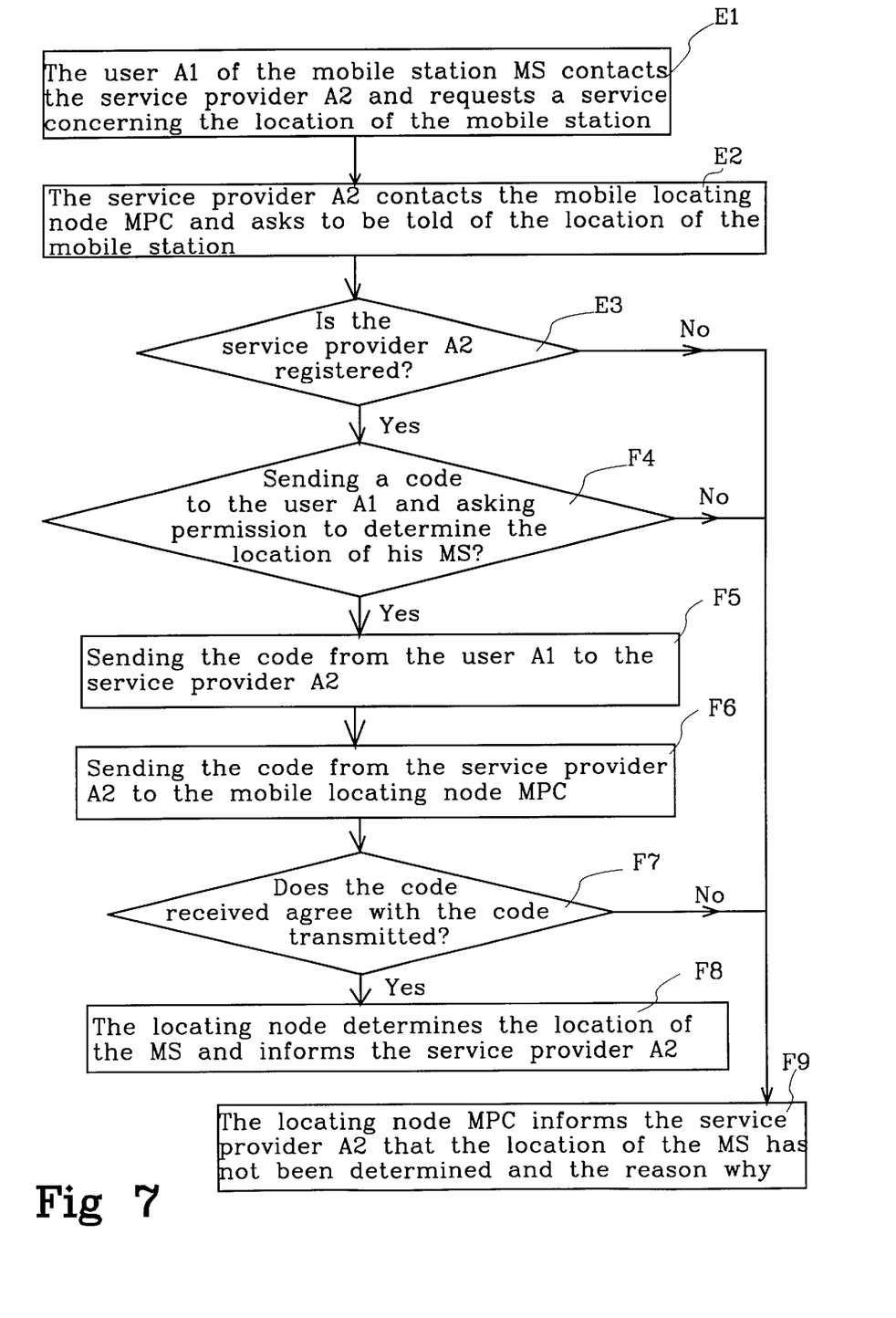
FIG. 7 is a flowchart illustrating an alternative method of checking for permission to locate a mobile in the same situation as that intended with respect to the method illustrated in FIG. 6.

FIG. 7 illustrates another embodiment of the invention that is suitable for use when the user A1 requests a mobile station MS-location related service from the service provider A2. The first three steps E1, E2 and E3 of the procedure are the same as those in the procedure illustrated in FIG. 6. In these steps, the user A1 requests the service provider A2 to provide the service, the service provider contacts the mobile locating node MPC to find out the location of the user A1, and the mobile locating node MPC checks that the service provider A2 is registered.

If it is found that the service provider A2 is registered, i.e. Yes to the question in step E3, the mobile locating node MPC sends a request to the user A1 of the mobile station MS asking for permission to determine location, in accordance with step F4. A password is sent together with the request. The user gives permission for the location to be determined, i.e. says yes to the question in F4, by sending the password to the service provider A2, in accordance with step F5.

The service provider A2 sends the password to the mobile locating node MPC in accordance with step F6. The mobile locating node MPC then checks that the password received from the service provider A2 agrees with the password sent to the mobile station MS. This latter procedure is carried out in step F7 in FIG. 7. When the passwords are found to agree with one another, the location of the mobile station MS is determined and the service provider A2 informed of the location, in accordance with step F8.

On the other hand, if the service provider A2 is not found to be registered, or no password is sent to the mobile locating node MPC from the mobile station via the service provider, or should the password received not agree with the password that was sent by the mobile locating node MPC, i.e. a negative response to any of the questions raised in steps E3, F4 or F7, the location of the mobile is not determined and the service provider A2 is informed of the reason why, in accordance with step F9.

The procedures carried out in steps F8 and F9 in FIG. 7 correspond to the procedures carried out in respective steps E6 and E7 in FIG. 6.

Figure 8:
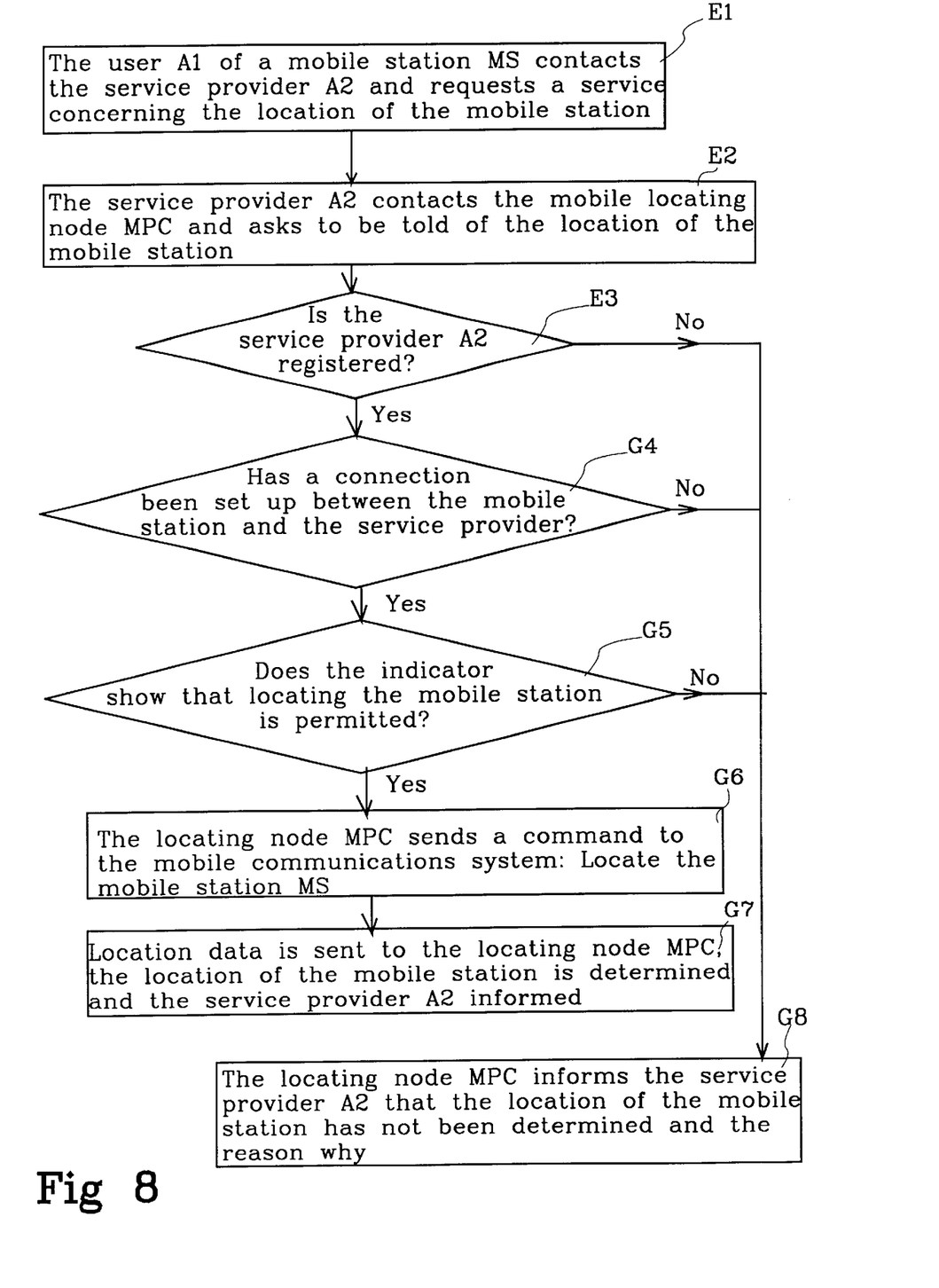
FIG. 8 is a flowchart illustrating another alternative method of checking whether or not permission to determine the location of a mobile has been given, in the same situation as that intended for the method illustrated in FIG. 6.

FIG. 8 illustrates a further alternative embodiment suitable for use in conjunction with the user A1 requesting a mobile station MS location dependent service from a service provider A2. The procedure followed in accordance with this method differs from the procedures illustrated in FIG. 6 and FIG. 7 by virtue of the fact that the user A1 need not actively express permission for the location of the mobile station MS to be determined in response to the request from the service provider A2.

The procedure followed in the method illustrated in FIG. 8 is commenced with the same three steps E1, E2 and E3 as those with which the procedures illustrated in FIG. 6 and FIG. 8 are commenced. According to these steps, the user A1 first contacts the service provider A2 who then contacts the mobile locating node MPC and asks to be told of the location of the user A1. After the mobile locating node MPC has ascertained that the service provider A2 is known, i.e. Yes in step E3, there follows a first step G4 which distinguishes the method of FIG. 8 from the methods of the two preceding Figures.

In step G4, it is checked that a connection has been set up between the mobile station MS and the service provider A2. If it is found that a connection has been set up, i.e. the answer to the question in step G4 is Yes, the procedure in step G5 is carried out.

In step G5, it is checked that the indicator I in the mobile communications system indicates that the user A1 has given permission for the location of the mobile station MS to be determined. Step G5 in FIG. 8 corresponds to step C5 in FIG. 5. Step G6 is carried out when the indicator I indicates that the user has given permission, i.e. Yes to the question raised in step G5. In step G6, the mobile locating node MPC sends to the mobile switching center MSC a command K1 to determine the location of the mobile station MS.

Mobile station MS location data is sent in a following step G7 to the mobile locating node MPC, which establishes the location of the mobile station MS and sends a message M2 that reveals the location of the mobile station MS to the service provider A2.

On the other hand, should the service provider A2 not be found to be registered with the mobile locating node MPC or that no connection has been set up between the service provider A2 and the mobile station MS or the indicator I shows that the user has not given permission for the location of the mobile station MS to be determined, i.e. a No to any one of the questions in respective steps E3, G4 or G5, the location of the mobile station MS will not be determined and the mobile locating node MPC informs the service provider A2 to this effect in a message M2, in accordance with step G8.

In step C2 in FIG. 5 and in step E3 in FIG. 6, FIG. 7 and FIG. 8, a check is run to ascertain whether or not the second party A2 is registered in the mobile locating node MPC. This step can be omitted from the described embodiments, if so desired. One reason for omitting step C3 and step E3 respectively may be because the second party A2 can be billed without prior registration in the mobile locating node MPC.

The steps G5, G6, G7 and G8 are corresponded by the steps C2, C5, C6, C7, C8 and C9 in FIG. 5.

In the FIG. 2 illustration and in the described embodiments, the indicator I is placed in the home location register HLR. However, the indicator I may be placed in any other of the system nodes, for instance in the gateway MSC, referenced P, the visitor location register VLR, the mobile services switching center MSC, or in the mobile station MS. The indicator I can alternatively be placed in the mobile locating node MPC. The mobile location node MPC should the preferably be managed by the operator.

When placed in the mobile station, the indicator I will be stored in a memory intended for this purpose. The user sets the indicator I to indicate either that permission to locate the mobile station MS is granted or is not granted, via the standard user interface. The mobile locating node MPC checks the indicating state of the indicator I, by sending a query to the mobile station MS regarding permission to locate the whereabouts of a mobile station. This query and the response received can be sent to and from the mobile station MS in a number of ways. For instance, it is possible to use both a modified radio interface between the mobile station and the base station controller BSC together with a MAP protocol, USSD (Unstructured Supplementary Service Data) and short messages. Both the query and the mobile station MS are modified so that the query regarding the state of the indicator is answered by the mobile station without involving the user.

If the optional subscriber indicator SI is implemented the indicator and the subscriber indicator I shall preferably be implemented in node fully controlled by the operator, i.e. not in the mobile station MS.

The present invention is not concerned with the manner in which data is collected. In the aforedescribed embodiments, it is the mobile switching center MSC that is responsible for data collection. This data collection can include the switching center being responsible for determining the location of the mobile station, for instance by measuring the wave propagation delay between the mobile station MS and one or more of the base stations BTS1–BTS3. Data collection can alternatively require the mobile switching center to disclose the traffic area within which the mobile station MS is located. A traffic area is comprised of one or more cells CL1–CL3.

Alternatively, data collection can be effected at a node other than the mobile switching center MSC. This other node may, for instance, be the base station controller BSC, the mobile station MS, or at the mobile station MS. In this latter case, the mobile station MS will be equipped for collecting mobile station MS location data, such equipment being a GPS terminal.

In the aforedescribed examples, the command K1 concerning the location of a mobile station is sent with the aid of a modified short message. A mobile locating command K1 can be sent to the node responsible for collecting mobile locating data in a number of ways. The possibilities given by way of example for transmitting a query concerning permission to determine the location of a mobile station MS when the indicator I is placed in the mobile station MS can also be used to send a mobile locating command K1.

In the FIG. 1 illustration, the mobile locating node MPC is connected to the mobile communications system GSM by connection with the GMSC P. However, the mobile locating node MPC can be connected in other ways. For instance, it can be connected to the home location register HLR. An alternative solution is to include the mobile locating node MPC as an integrated part of one of the nodes of the mobile communications system, for instance an integrated part of the GMSC P.

FIG. 1 shows the mobile locating node MPC freestanding from the mobile communications system GSM. It is, however, possible to extend the specification for the mobile communications system GSM to include the same functions as those of the aforedescribed mobile locating node. The functions of the mobile locating node MPC are to receive the mobile locating request M1, to ascertain whether or not the location of the mobile station MS may be disclosed (in several embodiments), to send a mobile locating command K1, to receive mobile station MS location data, to optionally further process mobile station MS location data, and to divulge the location of the mobile station MS to the second party A2.

In a number of cases and in a number of mobile communications networks GSM, the GMSC P manages the duties of the mobile switching center MSC. In FIG. 1, these are shown as separate units since this is the most common form.

In the first method shown in FIG. 4, the command K1 is sent with a modified short message. The manner in which the short message shall be modified is described in the earlier patent application SE 9700522-7. However, SE 9700522-7 does not describe how the GMSC P in connection with a routing info request shall inform the home location register HLR that the request shall be used to determine the location of a mobile station MS.

In GSM terminology, this request for information sent by the GMSC P to the home location register HLR is designated "Send Routing Info For Short Message". This request is described by specification GSM 09.02.

Figure 9:
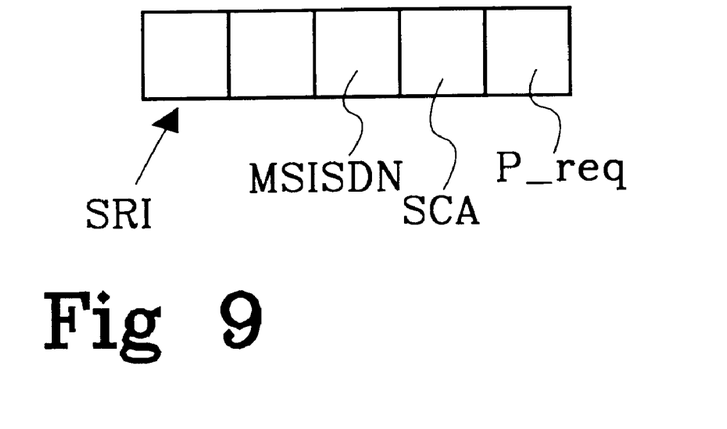
FIG. 9 illustrates the format of a request for routing information, sent by the GMSC to the home location register.

FIG. 9 illustrates in principle the format of the routing info request SRI sent by the GMSC P to the home location register HLR. The request SRI has a number of different information fields, of which only a few are shown in FIG. 9. One of these information fields MSISDN includes the identity of the mobile station MS. Another field, SCA, identifies the sender. The request SRI shown in FIG. 9 has been modified by adding a further information field P_req to the request SRI. This additional information field P_req indicates to the home location register HLR that the routing info request shall be used for locating the location of a mobile station MS.

When the home location register HLR receives a modified routing info request SRI, it checks whether or not the indicator is in a mobile locating state. When such a state is indicated, the home location register sends routing information. The information is sent in a message entitled "Short Message Routing Information Message", see specification GSM 09.02.

FIG. 1 illustrates the inventive method as carried out in a cellular mobile communications system. It will be understood, however, that the invention is not restricted to application in a cellular mobile communications system and that the invention can be applied in all telecommunications systems in which the users are mobile. By being mobile is meant that a subscriber is not tied to a certain electric wall plug or socket but that a terminal with associated subscription can be used for both incoming and outgoing traffic within a wide geographical area.

What is claimed is:

1. A method in a telecommunication system comprising a mobile station handled by a first party, wherein the method comprises the steps of:
    a) the first party contacting a service provider via the mobile station and requesting a service that needs a location of the mobile station to be divulged to the service provider;
    b) the service provider requesting from a positioning node to determine and divulge the location of the mobile station;
    c) the positioning node asking the first party via the mobile station for permission to determine and divulge the location of the mobile station; and
    d) the positioning node determining the location of the mobile station and divulging the location to the service provider when permission is received from the first party via the mobile station.

2. A method according to claim 1, wherein, in step c, the first party is informed of an identity of the service provider.

3. A method according to claim 1, wherein each service that needs the location of the mobile station requires new permission from the first party.

4. A method in a telecommunication system comprising a mobile station handled by a first party, wherein the method comprises the steps of:
    a) the first party contacting a service provider via the mobile station and requesting a service that needs a location of the mobile station to be divulged to the service provider;
    b) the service provider requesting a positioning node to determine and divulge the location of the mobile station;
    c) the positioning node informing the mobile station of a password;
    d) the mobile station informing the service provider of the password;
    e) the service provider informing the positioning node of the password;
    f) the positioning node comparing the password received from the service provider with the password sent to the mobile station and when the passwords are the same, the location of the mobile station is determined and divulged to the service provider.

5. Method according to claim 4, wherein an identity of the mobile station is provided to the service provider in step a and provided to the positioning node in step b and step c.

6. Method according to claim 4, wherein an information link is set up between the mobile station and the service provider from step a through step f.

7. A secured integrity function in connection with a mobile communication system operated by an operator wherein the secured integrity function comprises,
    an encrypted list of mobile station identities that are to be prohibited from being located, and
    an encryption key for reading the encrypted list, and
    wherein the secured integrity function is arranged a) to receive from the mobile communication system an inquiry of permission to determine and divulge the location of a specified mobile station and b) to determine if the specified mobile station is on the encrypted list and if so deny permission in response to the inquiry.

* * * * *